United States Patent [19]

Hitora

[11] 4,229,781

[45] Oct. 21, 1980

[54] BEAM-ROTARY LAMP

[75] Inventor: Shozo Hitora, Nara, Japan

[73] Assignee: Sasaki Electric Manufac. Co. Ltd., Osaka, Japan

[21] Appl. No.: 1,277

[22] Filed: Jan. 5, 1979

[51] Int. Cl.³ .............................................. F21V 21/26
[52] U.S. Cl. ...................................... 362/274; 362/35; 362/269; 362/272; 362/397; 340/81 R
[58] Field of Search ................... 362/35, 66, 269, 271, 362/272, 274, 397; 340/81 R, 87, 90

[56] References Cited

U.S. PATENT DOCUMENTS

| | | | |
|---|---|---|---|
| 1,238,220 | 8/1917 | Thurber | 362/272 |
| 2,548,154 | 4/1951 | Gusswiller | 362/272 |
| 2,814,029 | 11/1957 | McRea | 340/87 |
| 3,117,302 | 1/1964 | Cardarelli | 340/87 |

*Primary Examiner*—Donald P. Walsh
*Attorney, Agent, or Firm*—Browdy and Neimark

[57] ABSTRACT

In a beam-rotary lamp which has a reflector revolving around an electric lamp, an improvement is presented herein which is characterized by that a lamp unit is set together with a power unit comprising a reflector driving motor inside a closed helmet-shaped space, wherein the space is formed with a transparent bowl-shaped globe and an egg-shaped flat chassis put on said globe.

4 Claims, 3 Drawing Figures

BEAM-ROTARY LAMP

The present invention relates to a beam-rotary lamp, especially to such a lamp that is fixed outdoors or on an automobile roof to give out an intermittent warning light or a decoration light.

The conventional beam-rotary lamp has been composed of an upper cylindrical globe in which a lamp unit comprising an electric lamp and a reflector is set and a bottom case in which a power unit comprising a motor is set. Therefore, the lamp is higher than the globe needs. The driving shaft of the motor and the rotation axis of the reflector are located co-axially or in parallel. Several gears are mounted between the shaft and the axis to reduce the revolution of the motor and to conduct the power. There have been fears of troubles in the above-described conventional lamp, due to its said complicated structure.

The object of the present invention is to provide with a more compact beam-rotary lamp having a novel oval bowl-like shape.

The other object is to present a beam-rotary lamp which has a more simple structure and works smoothly with less trouble.

The novel beam-rotary lamp in the present invention has in the same manner as in usual ones a reflector which revolves around an electric lamp. However, a lamp unit comprising said reflector and lamp is set inside an unique closed space together with a power unit. The space having a helmet-like shape is formed with an egg-shaped chassis and a transparent bowl-shaped globe put on said chassis.

The lamp unit is located in a front portion of the space, the portion being higher and wider than a rear portion of said space. In the rear portion, the power unit is set. Said two units are combined by a friction drive mechanism.

The details and advantages will be understood from the following explanation of embodiment illustrated with the attached drawings.

IN THE DRAWINGS

Figure 1:
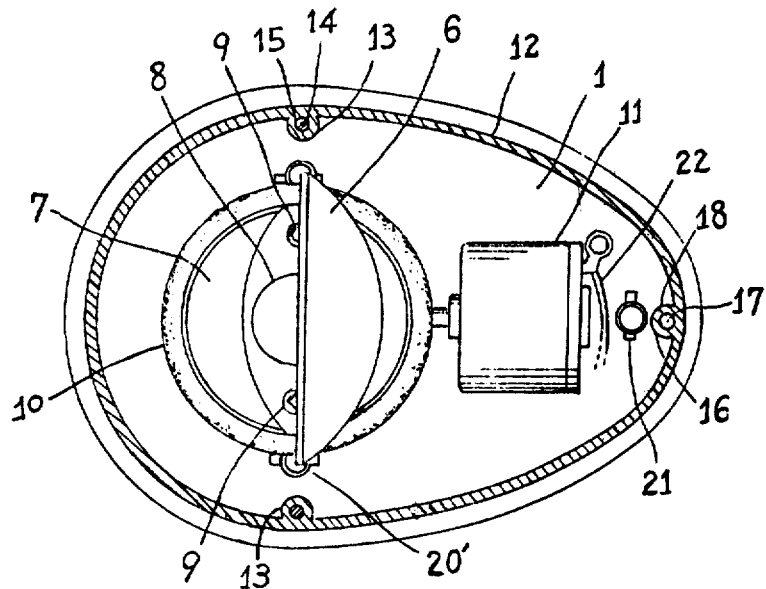
FIG. 1 is a plan view of an embodiment which is partially cut transversely.

As shown in Figures, a chassis 1 is a substantially egg-shaped plate. The front portion of chassis 1 is partially circular the diameter of which is larger than the one of a rear portion. The rear portion also is of a partially circular shape. Namely, said two portions are united to form an oval shape surrounded by tapering lines.

A socket supporting boss 3 is fixed at the front portion of chassis 1 with a nut 5. To the top of boss 3, a socket 2 is firmly attached. A corrugated spring washer 4 is laid between the boss and the socket.

A reflector 6 is fixed onto the upper surface of a rotor 7 with screws 9,9. The socket supporting boss 3 is inserted into the rotor 7 to support it rotatably around a lamp 8. The rotor 7 has a rubber ring 10 put on its round brim.

Figure 3:
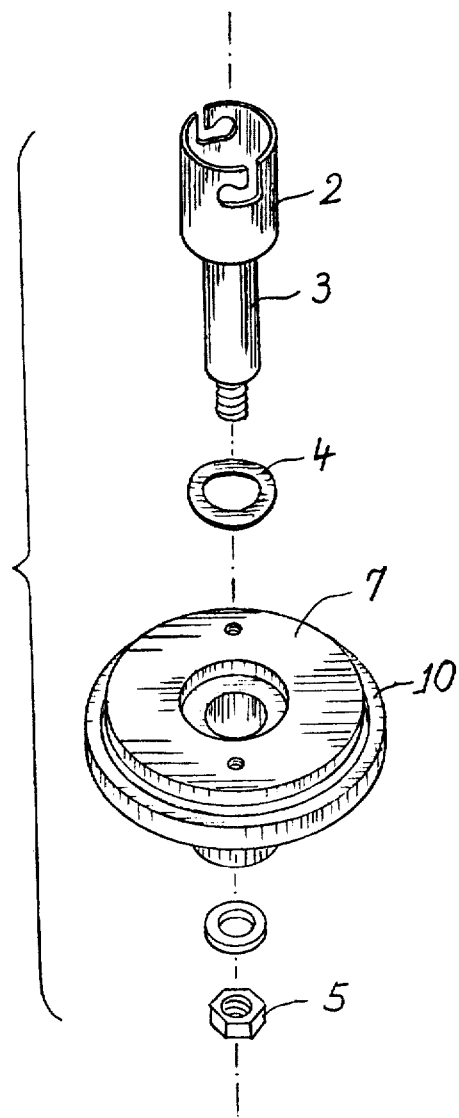
FIG. 3 is an isometric perspective view of a decomposed bearing portion of said embodiment.

A motor 11 is located at the rear portion of the chassis 1. The shaft 11' of the motor is brought into contact with the lower surface of the rubber ring 10 of the rotor 7. As illustrated in FIG. 3, the corrugated spring washer 4 is fitted into the central pit of the rotor 7 and the boss 3 projected downwards from the bottom of the socket 2 is inserted through the washer 4 and the rotor 7. Accordingly, the rotor 7 is pushed downwards by the elastic force of the washer 4 to press down firmly the rubber ring 10 against the motor shaft 11'.

The driving force of the motor 11 is smoothly and accurately conducted to the rotor 7 bearing the reflector, as the result and effect of the above-said mechanism.

Figure 2:
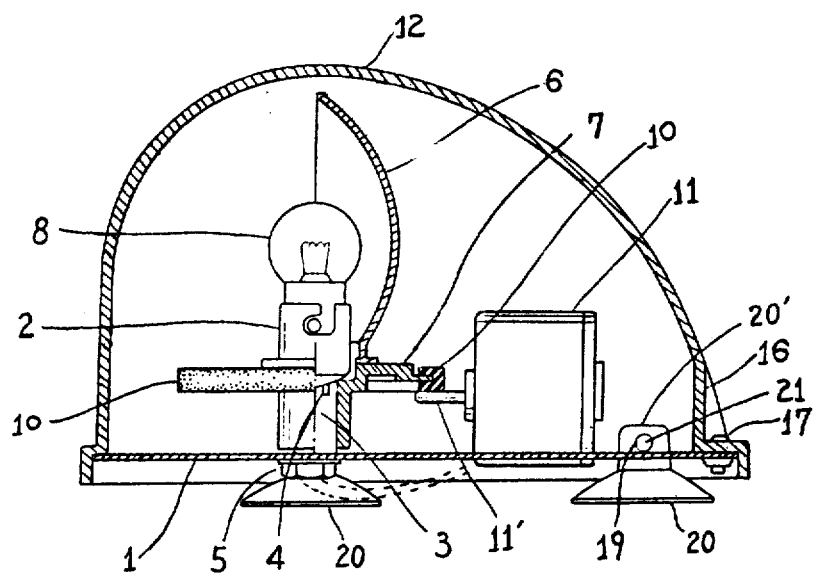
FIG. 2 is a side elevation of said embodiment which is partially cut vertically.

The numeral 12 indicates a colored transparent globe of a bowl shape as shown in FIG. 1 and FIG. 2. The front portion of the globe is nearly cylindrical and the rear portion has a shape of cut-in-half bowl. The globe has vertical ribs 13 and 13 inside its each side wall. Through the ribs vertical holes 15 and 15 for setting screws 14 and 14 are made. The globe has also a vertical rib 16 through which is made a vertical hole 18 for a setting screw 17.

The chassis 1 has some holes 19 through which heads 20' of stickers 20 are inserted and fixed with pins 21. The numeral 22 indicates a plug cord.

The above exemplified beam-rotary lamp will be used in case of emergency, being set with its stickers 20 on any desired place such as a roof of automobile, a road or other. The plug cord 22 is connected to power source to run the motor 11. The shaft 11' drives the rotor by the rubber ring 10 to rotate the reflector 6 around the lamp 8. The revolving reflector reflects the light of the lamp 8 through the transparent globe 12, giving an impression as if the light were intermittent. So, this beam-rotary lamp can be utilized effectively as an emergency lamp, working lamp, advertising lamp, decoration lamp or the likes.

The present invention is not restricted to the above embodiment but modified in many ways within the scope of the invention.

For example, a coil spring and a washer laid on the coil spring will be added between the socket 2 and the corrugated washer 4 when a smoother slipping between the rotor and the socket were needed.

Further, the shaft 11' of the motor can be brought in contact with the upper surface of the rubber ring 10 of the rotor 7. In this case, the corrugated spring washer inserted with the boss 3 must intervene between the chassis 1 and the rotor 7.

The following numerous benefits and advantages are gained by the invention.

At the first place, the beam-rotary lamp works always perfectly and accurately in disregard of undesirable situation or phisical condition. An inclining, a turning upside down or a vibration would not disturb said smooth working of the lamp. Said stability is brought about by the effect of the corrugated spring washer 4 which pushes always downwards the rotor 7 resulting in a firm contact of the rubber ring 10 with the motor shaft 11'.

The inside ribs 13 and 16 has a refracting effect making a glittering beam and also a reinforcing effect on the globe 12.

The special shape of the chassis 1 and the globe make it possible to compact the lamp. As described already, a lamp unit comprising the lamp 8 and the reflector 6 is set in the front wider portion, and a power unit comprising a motor 11 can be set in trim on the rear narrower portion. The whole dimension is thus made smaller.

What is claimed is:

1. A beam-rotary lamp comprising a substantially egg-shaped chassis; a transparent bowl-shaped globe, said globe being fixed to said chassis and defining therewith an enclosed space having a front and a rear portion, said rear portion being of less height and narrower than said front portion; a lamp unit including a lamp, a reflector and a rotor, said reflector being supported by said rotor, said rotor being arranged substantially horizontally and said lamp unit being positioned in said front portion of said space; a power unit located in said rear portion of said space, said power unit including a motor having a horizontally extending drive shaft; a socket, said lamp being set into said socket; a supporting boss projecting vertically downward from said boss and fixed to said chassis, said rotor being slidably, rotatable positioned over said boss for rotation about a vertical axis, said rotor having a round brim; a rubber ring positioned on said brim; and a corrugated spring washer positioned about said boss to maintain said rubber ring in friction contact with said horizontally extending drive shaft.

2. A rotary-beam lamp in accordance with claim 1, wherein said rubber ring has an upper surface, a lower surface and a peripheral surface, and wherein said shaft of said motor contacts said lower surface of said rubber ring, and said corrugated spring washer is positioned between said socket and said rotor.

3. A beam-rotary lamp in accordance with claim 1, wherein said rubber ring has an upper surface, a lower surface and a peripheral surface, and wherein said shaft of said motor contacts said upper surface of said rubber ring and said corrugated spring washer is positioned between said rotor and said chassis.

4. A beam-rotary lamp in accordance with either claim 2 or claim 7, including a coil spring positioned together with said corrugated spring washer to increase the repelling effect of said washer.

* * * * *